(12) United States Patent
Deutsch et al.

(10) Patent No.: US 6,631,403 B1
(45) Date of Patent: Oct. 7, 2003

(54) ARCHITECTURE AND APPLICATION PROGRAMMING INTERFACES FOR JAVA-ENABLED MPEG-4 (MPEG-J) SYSTEMS

(75) Inventors: Keith R. Deutsch, Palo Alto, CA (US); Robert L. Schmidt, Monmouth, NJ (US); Atul Puri, Bronx, NY (US); Gerard M. Fernando, Mountain View, CA (US); Pallavi K. Shah, Mountain View, CA (US); Viswanathan Swaminathan, Fremont, CA (US)

(73) Assignees: AT&T Corp., New York, NY (US); Sun Micro Systems, Palo Alto, CA (US)

( * ) Notice: Subject to any disclaimer, the term of this patent is extended or adjusted under 35 U.S.C. 154(b) by 0 days.

(21) Appl. No.: 09/309,895

(22) Filed: May 11, 1999

Related U.S. Application Data

(60) Provisional application No. 60/085,001, filed on May 11, 1998.

(51) Int. Cl.[7] .............................................. G06F 15/16
(52) U.S. Cl. ........................ 709/217; 709/231; 709/328
(58) Field of Search ................................. 709/203–205, 709/217–219, 231, 328

(56) References Cited

U.S. PATENT DOCUMENTS

| | | | | | |
|---|---|---|---|---|---|
| 5,793,425 A | * | 8/1998 | Balakrishnan | ............... | 370/468 |
| 5,896,139 A | * | 4/1999 | Strauss | ........................ | 345/440 |
| 5,953,506 A | * | 9/1999 | Kalra et al. | .................. | 709/231 |
| 6,072,478 A | * | 6/2000 | Kurihara et al. | ............. | 345/473 |
| 6,092,107 A | * | 7/2000 | Eleftheriadis et al. | ...... | 709/217 |
| 6,215,495 B1 | * | 4/2001 | Grantham et al. | ........... | 345/419 |
| 6,266,053 B1 | * | 7/2001 | French et al. | ................ | 345/440 |

OTHER PUBLICATIONS

Arikawa et al, "Dynamic LoD for QoS Management in the next generation VRML", IEEE 1996.*

* cited by examiner

*Primary Examiner*—Ayaz Sheikh
*Assistant Examiner*—Philip B. Tran

(57) ABSTRACT

MPEG-J is a collection of Java application programming interfaces (APIS) with which applications can be developed to interact with the platform and the content. In the context of MPEG-J, the platform is a device like a set-top box or a PC with Java packages conforming to a well-defined Java platform. The Java-based application consists of Java byte code, which may be available from a local source, like a hard disk, or it may be loaded from a remote site over a network. The MPEG-J Java byte code will be available as a separate elementary stream. The MPEG-4 system is the "Presentation engine" of MPEG-J. MPEG-J provides programmatic control through an "Application engine" which enhances the MPEG-4 browser by providing added interactive capability.

6 Claims, 5 Drawing Sheets

300

400

ARCHITECTURE AND APPLICATION PROGRAMMING INTERFACES FOR JAVA-ENABLED MPEG-4 (MPEG-J) SYSTEMS

This non-provisional application claims the benefit of U.S. provisional application No. 60/085,001, entitled "MPEG-J Architecture and API (V0.4)", filed on May 11, 1998, and which is incorporated herein by reference in its entirety. The applicants of the provisional application are Keith Deutsch, Gerard M. Fernando, Atul Puri, Robert L. Schmidt, Pallavi Shah and Viswanathan Swaminathan.

BACKGROUND OF THE INVENTION

1. Field of the Invention

This invention is directed to multimedia data storage, transmission and compression systems and methods. In particular, this invention is directed to systems and methods that implement the MPEG-J multimedia data storage, transmission and compression standards. This invention is also directed to control systems and methods that allow for graceful degradation and enhanced functionality and user interactivity of MPEG-4 systems.

2. Related Art

The need for interoperability, guaranteed quality and performance and economies of scale in chip design, as well as the cost involved in content generation for a multiplicity of formats, has lead to advances in standardization in the areas of multimedia coding, packetization and robust delivery. In particular, the International Standards Organization Motion Picture Experts Group (ISO MPEG) has created a number of standards, such as MPEG-1, MPEG-2, MPEG-4 and MPEG-J to standardize bitstream syntax and decoding semantics for coded multimedia.

In MPEG-1 systems and MPEG-2 systems, the audio-video model was very simple, where a given elementary stream covered the entire scene. In particular, MPEG-1 systems and MPEG-2 systems were only concerned with representing temporal attributes. Thus, there was no need to represent spatial attributes in a scene in MPEG-1 systems and MPEG-2 systems.

The success of MPEG-1 and MPEG-2, the bandwidth limitations of the Internet and other distributed networks and of mobile channels, the flexibility of distributed network-based data access using browsers, and the increasing need for interactive personal communication has opened up new paradigms for multimedia usage and control. The MPEG-4 standard addresses coding of audio-visual information in the form of individual objects and a system for combining and synchronizing playback of these objects.

MPEG-4 systems introduced audio-video objects, requiring that the spatial attributes in the scene also need to be correctly represented. Including synthetic audio-video content in MPEG-4 systems is a departure from the model of MPEG-1 systems and MPEG-2 systems, where only natural audio-video content representation was addressed. MPEG-4 systems thus provide the required methods and structures for representing synthetic and natural audio-video information. In particular, MPEG-4 audio-video content has temporal and spatial attributes that need to be correctly represented at the point of content generation, i.e., during encoding, and that also need to be correctly presented at the player/decoder. Because the MPEG-4 player/decoder also allows for limited user interactivity, it should more properly be referred to as an MPEG-4 browser.

Correctly representing temporal attributes in MPEG-4 systems is essentially no different than in MPEG-1systems and MPEG-2 systems. For these earlier standards, the temporal attributes were used to synchronize the audio portions of the data with the video portions of the data, i.e., audio-video synchronization such as lip-synchronization, and to provide system clock information to the decoder to help buffer management. Because significantly more diverse types of elementary streams can be included in MPEG-4 systems, representing temporal attributes is more complex. But, as mentioned earlier, the fundamental methods for representing temporal attributes in MPEG-4 systems is essentially the same as for MPEG-1 systems and MPEG-2 systems.

In the MPEG-1 systems and MPEG-2 systems standards, the specifications extend monolithically from the packetization layer all the way to the transport layer. For example, the MPEG-2 systems Transport Stream specification defined the packetization of elementary streams (i.e., the PES layer) as well as the Transport layer. With MPEG-4 systems, this restriction has been relaxed. The transport layer is not defined normatively, as the transport layer is very application specific. It is left to other standards setting bodies to define the transport layer for their respective application areas. One such body is the Internet Engineering Task Force (IETF), which will define standards for transporting MPEG-4 streams over the Internet.

Representing spatial information in MPEG-4 systems is carried out using a parametric approach to scene description. This parametric approach uses the Virtual Reality Modeling Language (VRML). The Virtual Reality Modeling Language allows spatial and temporal relationships between objects to be specified, and allows description of a scene using a scene graph approach.

The scene description defines one or more dynamic properties of one or more audio and video objects. However, in MPEG-4 systems, the Virtual Reality Modeling Language has been extended to provide features otherwise missing from Virtual Reality Modeling Language.

MPEG-4 uses a binary representation, BInary Format for Scene (BIFS), of the constructs central to VRML and extends VRML in many ways to handle real-time audio/video data and facial/body animation. The key extensions to Virtual Reality Markup Language for MPEG-4 systems involve streaming, timing and integrating 2D and 3D objects. These extensions are all included in the BInary Format for Scene (BIFS) specification.

FIG. 1 outlines one exemplary embodiment of a MPEG-4 systems player, which is also referred to as a "Presentation Engine" or an "MPEG-4 browser". The main components on the main data path are the demultiplexer layer, the media decoders, and the compositor/renderer. Between these three sets of components there are decoder buffers and composition buffers, respectively. The MPEG-4 systems decoder model has been developed to provide guidelines for platform developers. The binary format for scene data is extracted from the demultiplexer layer, and it is used to construct the scene graph.

Using application programming interfaces (APIs) has been long recognized in the software industry as a way to achieve standardized operations and functions over a number of different types of computer platforms. Typically, although operations can be standardized via definition of the API, the performance of these operations may still differ on various platforms, as specific vendors with interest in a specific platform may provide implementations optimized for that platform.

To enhance the features of VRML and to allow programmatic control, DimensionX has released a set of APIs known as Liquid Reality. Recently, Sun Microsystems has announced an early version of Java3D, an API specification that supports representing synthetic audiovisual objects as a scene graph. Sun Microsystems has also released the Java Media Framework Player API, a framework for multimedia playback.

SUMMARY OF THE INVENTION

As noted above, when coded multimedia is used for distributed networked and local networked applications on a multimedia data processing system, such as a personal computer, a number of situations may arise. First, the bandwidth for networked access of multimedia may be either limited or time-varying, requiring transmission of only the most significant information, followed by transmitting additional information as more bandwidth becomes available.

Second, regardless of the bandwidth available, the client, i.e., the multimedia data processing system, decoding the transmitted information may be limited in processing and/or memory resources. Furthermore, these resources may be time-varying. Third, a multimedia user may require highly interactive nonlinear browsing and playback. This is not unusual, because significant amounts of textual content on distributed networks, such as the Internet, are capable of being browsed using hyperlinked features and because this is also expected to be true for presentations employing coded audio-visual objects. The parametric MPEG-4 system may only be able to deal with the these situations in a very limited way. For example, when the parametric MPEG-4 system is incapable of decoding or presenting all of the coded audio-visual objects, the parametric MPEG-4 system may respond by dropping those objects or temporal occurrences of those objects. However, this results in choppy audio-visual presentations. Further, MPEG-4 may not offer any sophisticated control to the user to allow the user to deal with these situations.

To get around the limitations of this known parametric MPEG-4 system, another known implementation of the MPEG-4 standard is a programmatic MPEG-4 system. U.S. patent application Ser. No. 09/055,934, incorporated herein by reference, discloses such a programmatic MPEG-4 system. This programmatic MPEG-4 system includes a set of defined application programming interfaces (APIs) for media decoding, user functionalities and authoring. These application programming interfaces can be invoked by client applications. This programmatic MPEG-4 system allows a number of enhanced real-time and other functions in response to user inputs, as well as graceful degradation in the face of limited system resources available to MPEG-4 clients.

The incorporated 934 application discloses standardized interfaces for MPEG-4 playback and browsing under user control, as well as one type of response to time-varying local and networked resources. These interfaces facilitate adaptation of coded media data to immediately available terminal resources. These interfaces also facilitate interactivity expected to be sought by users, either directly as a functionality or indirectly embedded in audiovisual applications and services expected to be important in the future.

The incorporated 934 application also discloses an interfacing method in the form of a robust application programming interface specification including a visual decoding interface, a progressive interface, a hot object interface, a directional interface, a trick mode, a transparency interface, and a stream editing interface. These interfaces facilitate a substantial degree of adaptivity.

This invention provides systems and methods that use a combination of MPEG-4 media and safe executable code so that content creators can embed complex control mechanisms with in their media data to intelligently manage the operation of the audio-visual session.

This invention separately provides systems and methods for implementing the MPEG-J video data storage, compression and decoding standards.

This invention separately provides an improved MPEG-J architecture.

This invention additionally provides an improved MPEG-J architecture having improved structure, modularity and organization.

This invention separately provides an MPEG-J application engine that allows for graceful degradation of MPEG-4 content in view of limited processing, memory or bandwidth resources.

This invention separately provides an MPEG-J application engine that allows for enhanced functionality of and user interactivity with MPEG-4 content.

This invention separately provides application programming interfaces for MPEG-J.

New paradigms in communication, software and networking, such as that offered by the Java™ language, offer new opportunities for flexibility, adaptivity and user interaction. For instance, the advent of the Java™ language offers networking and platform independence critical to downloading and executing of applets, such as, for example, Java classes, on a client system from a server system storing the applets. Depending on the design of the applet, either a single access to the data stored on the server may be needed and all the necessary data may be stored on the client, or several partial accesses may be needed. This partial access design is used to reduce storage space and time needed for startup. This partial access design is referred to as streamed playback.

This invention provides a collection of Java API's with which applications can be developed to interact with a data processor and content. According to this invention, MPEG-J is a Java™-enabled set of standards that define the file organization, storage and compression of video data streams. In the context of MPEG-J according to this invention, the data processor can be implemented as a set-top box or a PC with Java packages conforming to a well-defined Java platform. The Java-based application includes Java byte code, which may be available from a local source, like a hard disk, or which may be loaded from a remote site over a network. As indicated above, the term "MPEG-4 browser" refers to the MPEG-4 system. MPEG-J adds programmatic control to the MPEG-4 system, through an "Application engine". The Application Engine enhances the Presentation Engine by providing added interactive capability. The MPEG-J Java byte code will be available to the MPEG-J Application engine as a separate elementary stream.

The improved architecture and application programming interfaces (APIs) of MPEG-J according to this invention allow selective media decoding facilitating graceful degradation to varying resources of a client, as well as improved functionalities as required in interactive user applications.

In one potential use of MPEG-J, a content provider designs all of the MPEG-J content, i.e., the MPEG-J data stream. This use of the MPEG-J standard is desirable for content providers, and requires only incremental updates to the MPEG-J data stream. In this case, any changes to the MPEG-J data stream can be done using binary format for scene (BIFS) updates. In another potential use of MPEG-J, the client dynamically controls the displayed video scene generated from the MPEG-J data stream. This use of the MPEG-J standard desirable for set top manufacturers. However, change in non-updatable nodes of the MPEG-J data stream may not be possible.

MPEG-J will eventually need to serve both of the potential uses. Since the first potential use is more deterministic than the second potential use, the systems and methods of this invention fully implement the first potential use. The systems and methods of this invention provide the hooks to partially implement the second potential use. In particular, in one exemplary embodiment of the systems and methods of this invention, the MPEG-J scene graph capabilities are always based on the tightly-integrated, i.e., content-provider-oriented, model.

In one exemplary embodiment of the application programming interfaces of this invention, the MPEG-J application programming interface (API) is not a single application programming interface, but rather is a collection of application programming interfaces (APIs) that address various interfaces for a flexible MPEG-4 system. In one exemplary embodiment, the MPEG-J application programming interfaces are implemented using the Java language. The application programming interfaces include one or more of an Application Manager API; a SceneGraph Manager API; a Resource Manager API; an Interactivity Manager API; a Media Decoders API; a Functionality API; a Networking API; and a Device API. In one exemplary embodiment of the application programming interfaces of this invention, one or more of these application programming interfaces are implemented as object-oriented-programming object classes. The object classes are organized into various packages. In particular, various objects of one or more of the application programming interfaces are collected into a single package.

These and other features and advantages of this invention are described in or are apparent from the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF THE PREFERRED EMBODIMENTS

Figure 1:
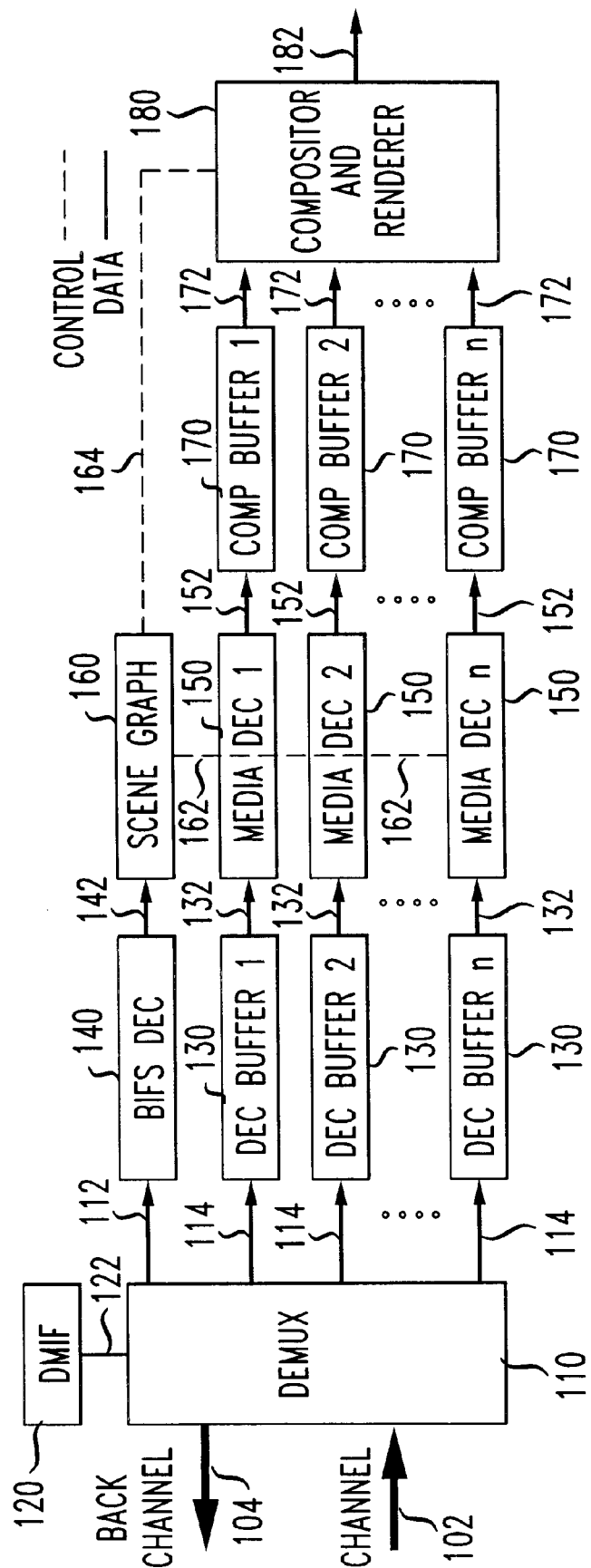
FIG. 1 is a functional block diagram of one exemplary embodiment of an MPEG-4 browser.

FIG. 1 is a functional block diagram outlining one exemplary embodiment of a MPEG-4 browser or presentation engine 100. As shown in FIG. 1, the presentation engine 100 includes a demultiplexer layer 110, a Delivery Multimedia Integration Framework (DMIF) subsystem 120, one or more decoder buffers 130, a BInary Format for Scene (BIFS) decoder 140, one or more media decoders 150, a scene graph controller 160, one or more compositor buffers 170, and a compositor/renderer 180. In particular, audio-video data is input to the demultiplexer layer 120 over a channel signal line 102, while handshake data is output by the demultiplexer layer 120 over a backchannel signal line 104.

The demultiplexer layer 110 is connected to the delivery multimedia integration framework subsystem 120 over a data channel 122. The demultiplexer layer 110 is also connected to the binary format for scene decoder 140 over a data channel 112 and to each decoder buffer 130 over a data channel 114. The binary format for scene decoder 140 is connected to the scene graph controller 160 over a data channel 142. Each decoder buffer 130 is connected to a corresponding media decoder 150 over a data channel 132. Each media decoder 150 is connected to a corresponding compositor buffer 170 over a dedicated data channel 152. Each compositor buffer 170 is connected to the compositor/renderer 180 over a data signal channel 172. The compositor/renderer 180 is connected over a data channel 182 to a downstream processing subsystem, such as a display.

The scene graph controller 160 outputs control signals to the compositor/renderer 180 over a control channel 162. The scene graph controller 160 also outputs control signals to each media decoder 150 over the channel or channels 162.

In operation, scene content in the form of MPEG-4 encoded audio-video streams is input to the demultiplexer layer 110 over the channel signal line 102. The encoded audio-video streams include a scene graph stream. The demultiplexer layer 110 uses the backchannel signal line 104 to acknowledge receipt of data, or to request data be resent, and, in a client-server environment, sends commands back to the server, and the like. The demultiplexer layer 110 then demultiplexes the encoded audio-video streams based on data input from the delivery multimedia integration framework subsystem 120 over the data channel 122, and outputs the demultiplexed scene graph stream, comprising encoded binary format for scene data, to the binary format for scene decoder 140 over the data channel 112 and each of the other encoded audio-video streams an appropriate one of the decoder buffers 130 over a corresponding one of the data channels 114. The binary format for scene decoder 140 decodes the encoded binary format for scene data and outputs it to the scene graph controller 160 over the data channel 142.

The scene graph controller 160 inputs the decoded binary format for scene data and generates a scene graph from the input binary format for scene data. The scene graph defines which objects will appear in the rendered scene, based on the binary format for scene data associated with each node of the generated scene graph. The scene graph controller 160, based on the generated scene graph, outputs decoding control signals over the channel or channels 162 to one or more of the media decoders 150.

Based on the decoding control signals from the scene graph controller 160, one or more of the media decoders 150 inputs encoded audio-video data appropriate for that media decoder 150 from the corresponding decoder buffer 130 over the corresponding data channel 132. Each such media decoder 150 decodes the input audio-video data to generate one or more audio or video objects. The decoded audio objects or video objects are output by that media decoder 150 to the corresponding compositor buffer 170 over the corresponding data channel 152.

The compositor buffers 170 store the decoded audio and video objects generated by the media decoders 150. The compositor/renderer 180, based on rendering control signals output by the scene graph controller 160 over the control channel 164, inputs various audio and video objects stored in the compositor buffers 170 over the data channels 172 and composes the input audio and video objects into a scene. In particular, the scene graph controller 160 generates the rendering control signals based on a current location within the scene graph. The compositor/renderer 180 outputs the rendered scene to a downstream processing subsystem, such as a display subsystem that displays the rendered scene on a display device. The compositor/renderer 180 may respond to very basic user interactions, such as mouse clicks, etc.

In one exemplary embodiment of the MPEG-4 browser 100 shown in FIG. 1, MPEG-4 coded data read from a storage device or received over a distributed network, such as a LAN, a WAN, the Internet or an intranet, goes through the delivery multimedia integration framework subsystem 120 and the demultiplexer layer 100. In the demultiplexer layer 100, FlexMux-PDU's pass through a Sync Layer resulting in unformatted SL-PDUs of each media type, such as, for example, encoded audio streams, encoded video streams, encoded speech streams or encoded facial animation streams. The unformatted SL-PDUs of each media type are then buffered in the respective decoder buffers 130 and are offered to the corresponding media decoders 150. Also, any SL-PDUs corresponding to scene description representation are input to the binary format for scene decoder 140. The output of the binary format for scene decoder 140 goes to the scene graph controller 160. The output of the media decoders 150 as well as the scene graph controller 160 feeds the compositor/renderer 180. The output of the compositor/ renderer 180 is the scene for presentation.

The MPEG-J systems and methods according to this invention are flexible programmatic control systems and methods that represent an audio-visual session in a manner that allows the session to adapt to the operating characteristics of the multimedia data processing system on which the MPEG-J application, the MPEG-4 browser and an execution engine, such as a display subsystem, are executing. The MPEG-J systems and methods according to this invention allow graceful degradation under limited or time varying resources. The MPEG-J systems and methods according to this invention also provide the ability to respond to user interaction and provide enhanced multimedia functionalities.

The MPEG-J systems according to this invention are programmatic systems that specify interfaces for interoperation of an MPEG-4 media browser with Java code. By combining MPEG-4 media and safe executable code, content creators may embed complex control mechanisms with their media data to intelligently manage the operation of the audio-visual session. In the MPEG-J systems according to this invention, Java code is delivered as a separate elementary stream to the multimedia data processing system. The Java code is directed to a MPEG-J run time environment of the multimedia data processing system. The MPEG-J run time environment includes a Java Virtual Machine, which provides the Java code access to the various components of the MPEG-4 browser 100.

Figure 2:
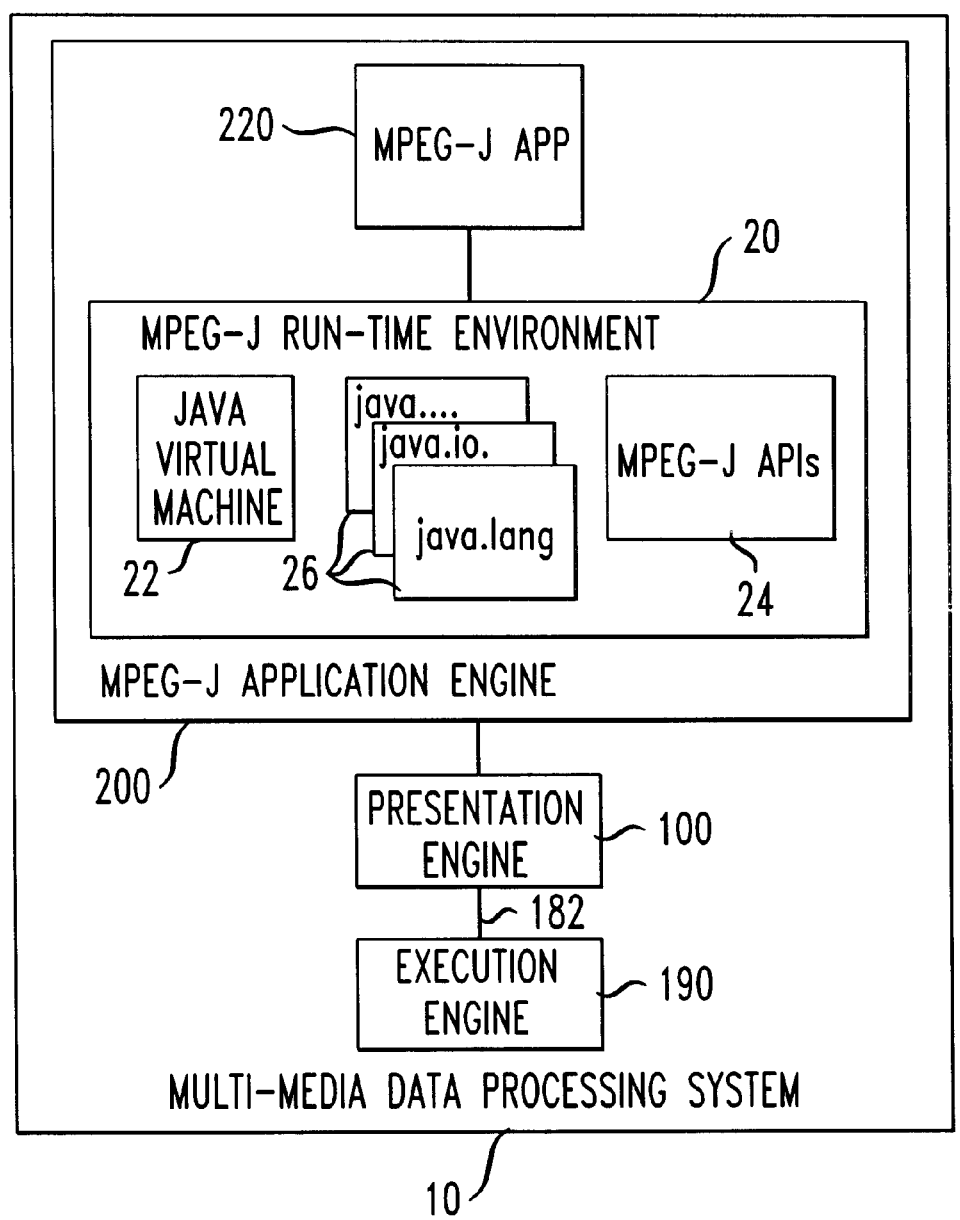
FIG. 2 is a functional block diagram of one exemplary embodiment of the components of an MPEG-J operating environment according to this invention.

FIG. 2 is a functional block diagram of one exemplary embodiment of the components of the MPEG-J operating environment. As shown in FIG. 2, a multimedia data processing system 10 includes an MPEG-J application engine 200, the MPEG-4 browser or presentation engine 100 and the execution engine 190. The MPEG-J application engine 200 includes an MPEG-J application 220 and an MPEG-J run time environment 20. The MPEG-J run time environment 20 includes a Java Virtual Machine 22 and a number of MPEG-J application programming interfaces (MPEG-J APIs) 24, as well as the standard Java system files 26.

The MPEG-J systems and methods of this invention deliver and run application programs that affect the behavior of the MPEG-4 browser or presentation engine, the rendered scene, and the content programming in general. To that end, the MPEG-J systems and methods of this invention define application program interfaces (APIs) to the various components of the MPEG-4 browser or presentation engine 100. Further, the MPEG-J systems and methods of this invention describes the delivery of application programs using the standard MPEG-4 elementary streams delivery mechanism. Besides delivering application programs to the MPEG-4 browser or presentation engine, the MPEG-4 browser or presentation engine can be configured with local application programs that use the same API's. Examples of sources of such local programs are programs that are downloaded, as well as commercially available programs that enhance the performance and functionality of the MPEG-4 browser or presentation engine. It should be appreciated that local programs will generally have no knowledge of the delivered specific MPEG-4 content. In contrast, the delivered programs that originate from the same author as the audio/ visual MPEG-4 content will generally have knowledge of the delivered specific MPEG-4 content.

The architecture of the MPEG-J application engine 200 takes into consideration the resources available on the underlying multimedia data processing system 10. The a architecture of the MPEG-J run time environment 20 isolates distinct components of the MPEG-J application engine 200, the design of application programming interface that reflects these components, and the characterization of interactions between these components.

The distinct components of the MPEG-J run time environment 20 include execution and presentation resources, decoders, network resources, and the scene graph. The architecture of the MPEG-J application engine 200 assumes that decoding and presenting resources of the underlying multimedia data processing system 10 are limited. The execution and presentation resources components abstract access to information on such static and dynamic resources in the MPEG-4 browser or presentation engine and notification during changes in such resources. The execution and presentation resources components provides for some minimal control of the static and dynamic resources in the MPEG-4 browser or presentation engine.

The decoders component abstracts the media decoders used to decode the received media streams. The decoders component also abstracts the programmatic control of the media decoders and the manipulation of the media decoders that is used to add extra functionality to the MPEG-4 browser or presentation engine.

As described above, the MPEG-4 browser or presentation engine receives media streams. The network resources component abstracts the control of the received media streams. The network resources component also abstracts the media pipeline or pipelines that transport and present the media streams to the MPEG-4 browser or presentation engine.

As described above, each session presented by the MPEG-4 browser or presentation engine has a Scene Graph to represent and spatially and temporally locate the audiovisual objects of that session. The scene graph component abstracts access to and control of the scene graph.

Figure 3:
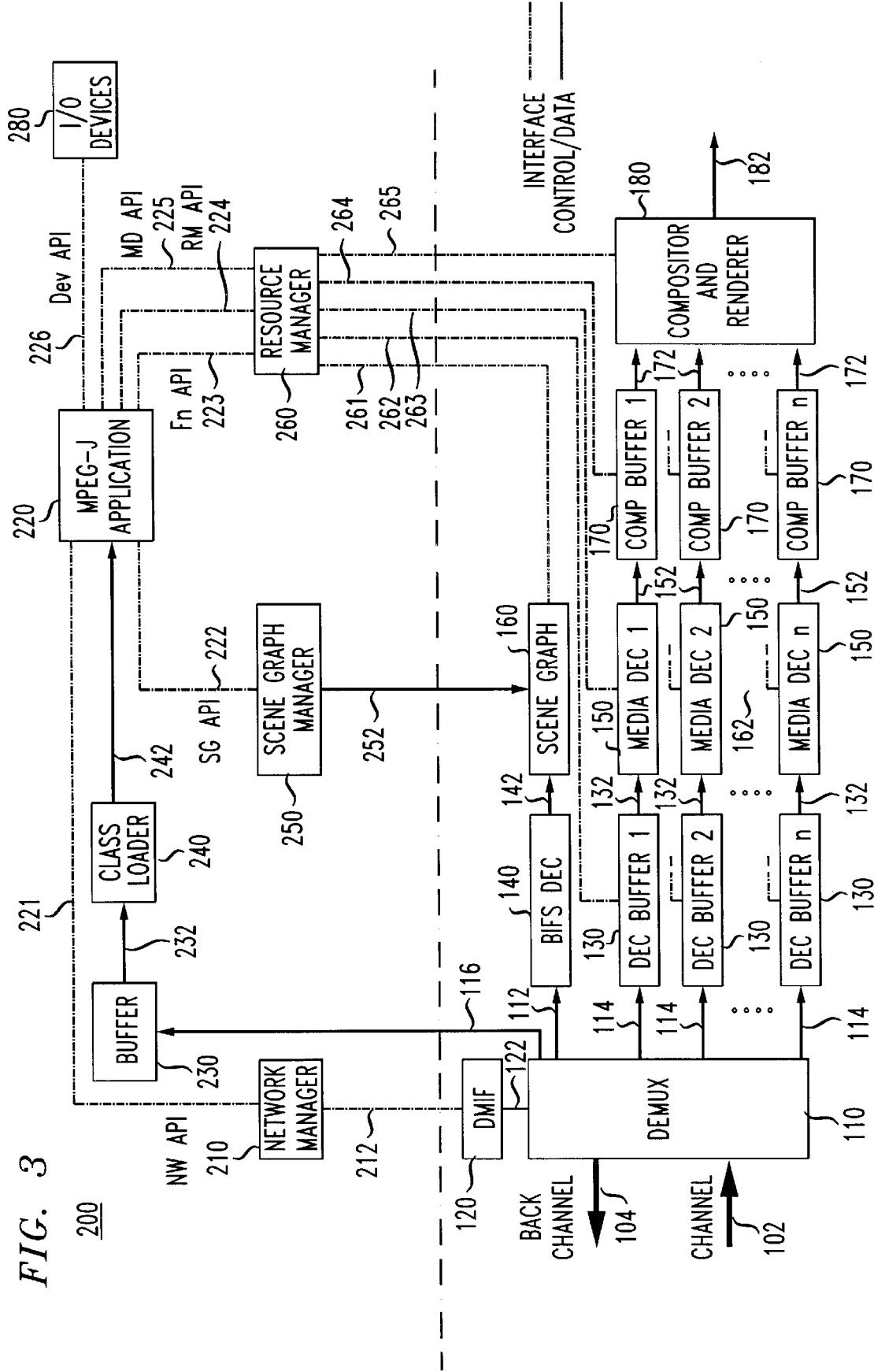
FIG. 3 is a functional block diagram showing in greater detail a first exemplary embodiment of the MPEG-J application engine of FIG. 2 according to this invention.

FIG. 3 shows a functional block diagram illustrating in greater detail a first exemplary embodiment of the MPEG-J application engine 200 of FIG. 2 according to this invention. The MPEG-J systems and methods according to this invention allows a combination of MPEG-4 media and safe executable code, so that the content creators can embed complex control mechanisms within their media data to intelligently manage the operation of the audio-visual session. In the first exemplary embodiment shown in FIG. 3, the architecture of the MPEG-J systems according to this invention includes, in the lower portion of the MPEG-J run time environment 20, the exemplary embodiment of the MPEG-4 browser or presentation engine 100 shown in FIG. 2. The MPEG-J system or application engine 200 forming the upper portion of the MPEG-J run time environment 20 specifies the interfaces and control structures that control the MPEG-4 browser or presentation engine 100.

As shown in FIG. 3, the first exemplary embodiment of the MPEG-J system or application engine 200 includes a network manager 210, the MPEG-J application controller 220, a buffer 230, a class loader 240, a scene graph manager 250, a resource manager 260, and one or more input/output (I/O) devices 280. The I/O devices 280 can be any known or later developed input or output device, including a mouse, a keyboard, a touchscreen, a pen device, a set-top remote control device, a television remote control device, a display device, such as a television, a CRT-type display, an LCD-type display, an LED-type display, a printer, or the like.

The network manager 210 is connected to the delivery multimedia integration framework subsystem 120 and the MPEG-J application controller 220 through interface channels 212 and 221, respectively, of a network application programming interface Nw API. The buffer 230 is connected by a data channel 116 to the demultiplexer layer 110 and a data channel 232 to the class loader 240. The class loader 240 is connected to the MPEG-J application controller 220 by a data channel 242. The scene graph manager 250 is connected to the scene graph controller 160 and the MPEG-J application controller 220 through interface channels 252 and 222, respectively, of a scene graph application programming interface SG API.

The resource manager 260 is connected to the MPEG-J application controller 220 through interface channels 223, 224 and 225 of a functionality application programming interface Fn API, a media decoders application programming interface MD API, and a resource manager application programming interface RM API, respectively. The resource manager 260 is also connected through interface channels 261–265 of the resource manager application programming interface RM API to the scene graph manager 160, the decoder buffers 130, the media decoders 150, the compositor buffers 170 and the compositor/renderer 180, respectively. The I/O devices 280 are connected to the MPEG-J application controller 220 through an interface channel 226 of a device application programming interface Dv API. The network application programming interface Nw API, the scene graph application programming interface SG API, the functionality application programming interface Fn API, the media decoders application programming interface MD API, the resource manager application programming interface RM API, and the device application programming interface Dv API are described in greater detail below.

The network manager 210 interfaces the MPEG-J application controller 220 with the delivery multimedia integration framework subsystem 120 using the interface channels 212 and 221 of the network application programming interface Nw API. The scene graph manager 250 interfaces the MPEG-J application controller 220 with the scene graph controller 160 using the interface channels 222 and 252 of the scene graph application programming interface SG API. The resource manager interfaces the MPEG-J application controller 220 with the scene graph controller 160, the decoder buffers 130, the media decoders 150, the compositor buffers 170 and the compositor/renderer 180 using the interface channels 261-265 of the resource manager application programming interface RM API. The interface channel of the device application programming interface Dv API allows users to directly interact with and control the MPEG-J application controller 220 using one or more of the I/O devices 280. Thus, the user input, through the MPEG-J application controller 220, can be used to control the various elements of the MPEG-4 browser or presentation engine 100.

The scene graph manager 250 allows direct control of the binary format for scene graph that specifies the scene to be rendered. In particular, the scene graph manager 250 is able to turn off portions of the scene graph to better match the processing and/or memory resources of the underlying multimedia data processing system 10 available to the MPEG-J run time environment 20 to the resources needed to render the scene. Thus, the scene graph manager 250 controls the scene graph controller 160 to modify the scene graph or the generated multimedia scene in view of the current system resources, user inputs, and/or any embedded control mechanisms, such as behavior control commands. In particular, the scene graph or the generated multimedia scene is modified to gracefully or controllably degrade the generated multimedia scene.

The resource manager 260 manages system resources of the underlying multimedia data processing system 10, allowing the regulation of overall performance. This includes controlling the scene graph controller 160, the media buffers 130, the media decoders 150, the compositor buffers 170, the compositor/renderer 180 and MPEG-J run time environment 20 functionalities and resources in view of the current system resources, user inputs, and/or any embedded control mechanisms, such as behavior control commands. In particular, the resource manager 260 controls these elements to gracefully or controllably degrade the generated multimedia scene.

The network manager 210 provides a path for the MPEG-J application controller 220 to send requests or receive data through the MPEG-J application controller 220. The network manager 210 can also monitor the network resources of the distributed network, and can control the connection to the distributed network in view of the current network resources, user inputs, and/or any embedded control mechanisms, such as behavior control commands. The network manager 210 also allows the MPEG-J application controller 220 access to the network resources of the distributed network. The MPEG-J application controller 220 can then control the MPEG-4 browser or presentation engine 100 in view of the current network resources, user inputs, and/or any embedded control mechanisms, such as behavior control commands.

Figure 4:
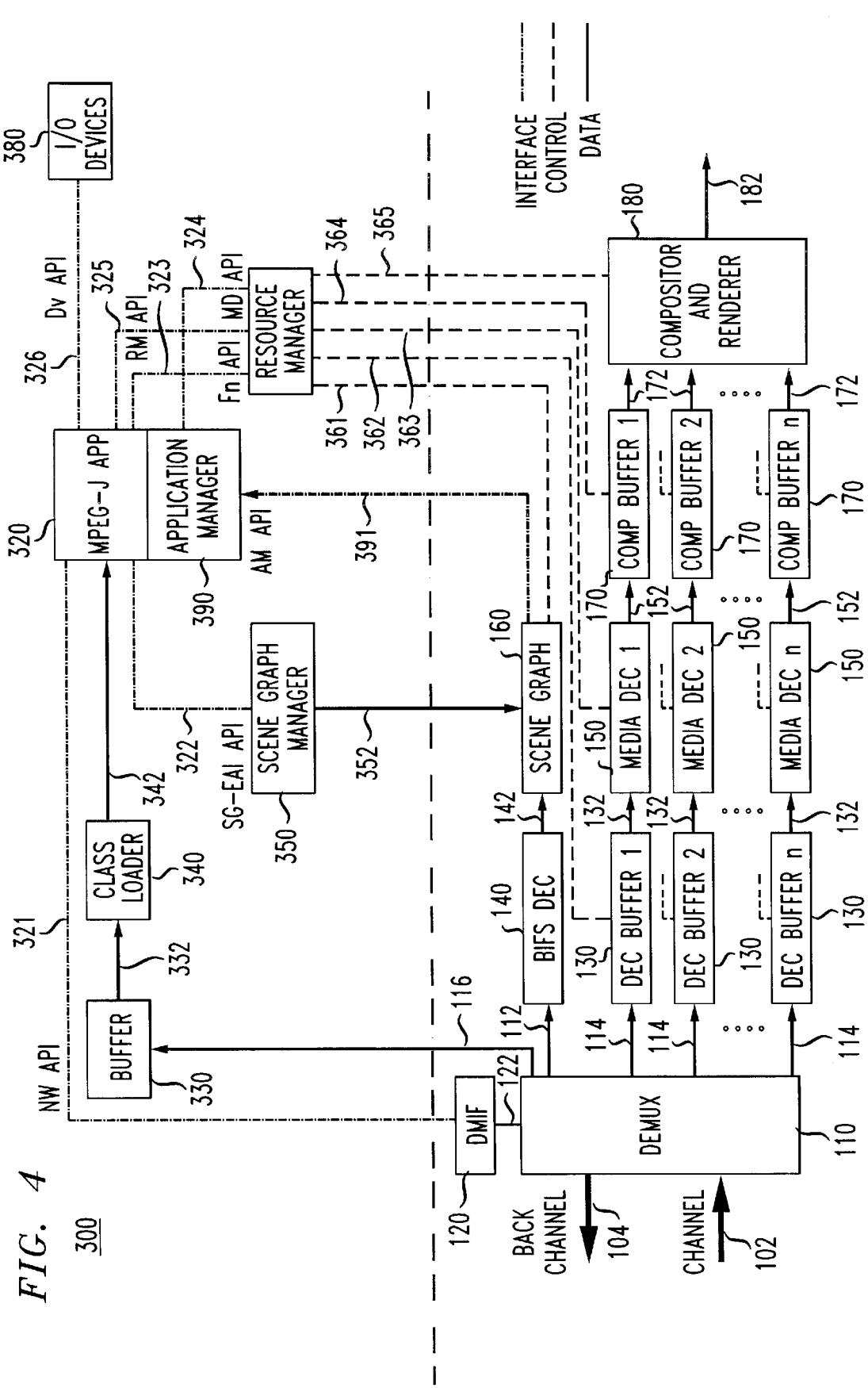
FIG. 4 is a functional block diagram showing in greater detail a second exemplary embodiment of the MPEG-J application engine of FIG. 2 according to this invention.

FIG. 4 shows a functional block diagram illustrating in greater detail a second exemplary embodiment of the MPEG-J application engine 300 of FIG. 2 according to this invention. The second exemplary embodiment of the MPEG-J application engine 300 is generally identical to the first exemplary embodiment of the MPEG-J application engine 200 shown in FIG. 3, except that the second exemplary embodiment of the MPEG-J application engine 300 separates the control and data channels and reorganizes the interface and control channels between a number of the components of the second exemplary embodiment of the MPEG-J application engine 300. In the second exemplary embodiment of the MPEG-J application engine 300, the network manager 210 has been deleted, with the network interface channel 321 connected directly to the delivery multimedia integration framework subsystem 120. The MPEG-J application controller 320 includes an application manager 390.

As shown in FIG. 4, the scene graph manager 350 is still connected to the scene graph controller 160 and the MPEG-J application controller 320. However, the scene graph manager 350 is now connected to the scene graph controller 160 over a control channel 352 and to the MPEG-J application controller 320 over an interface channel 322 of a scene graph-external application interface application programming interface SG-EAI API. The scene graph controller 160 is now connected to the application manager 390 over an interface channel 391 of an application manager application programming interface AM API.

Similarly, the resource manager 360 remains connected to the MPEG-J application controller 320 through interface channels 323 and 325 of the functionality application programming interface Fn API and the resource manager application programming interface RM API, respectively. However, the resource manager 360 is now connected to the application manager 390 over the interface channel 324 of the media decoders application programming interface MD API. Furthermore, the resource manager 260 is now connected through control channels 361–365 to the scene graph manager 160, the decoder buffers 130, the media decoders 150, the compositor buffers 170 and the compositor/renderer 180, respectively.

The network application programming interface Nw provides a path for the MPEG-J application controller 320 to send requests or receive data through the MPEG-J application controller 320. The MPEG-J application controller 320 can also monitor the network resources of the distributed network, and can control the connection to the distributed network in view of the current network resources, user inputs, and/or any embedded control mechanisms, such as behavior control commands. The network application programming interface Nw also allows the MPEG-J application controller 320 access to the network resources of the distributed network. The MPEG-J application controller 320 can then control the MPEG-4 browser or presentation engine 100 in view of the current network resources, user inputs, and/or any embedded control mechanisms, such as behavior control commands.

Figure 5:
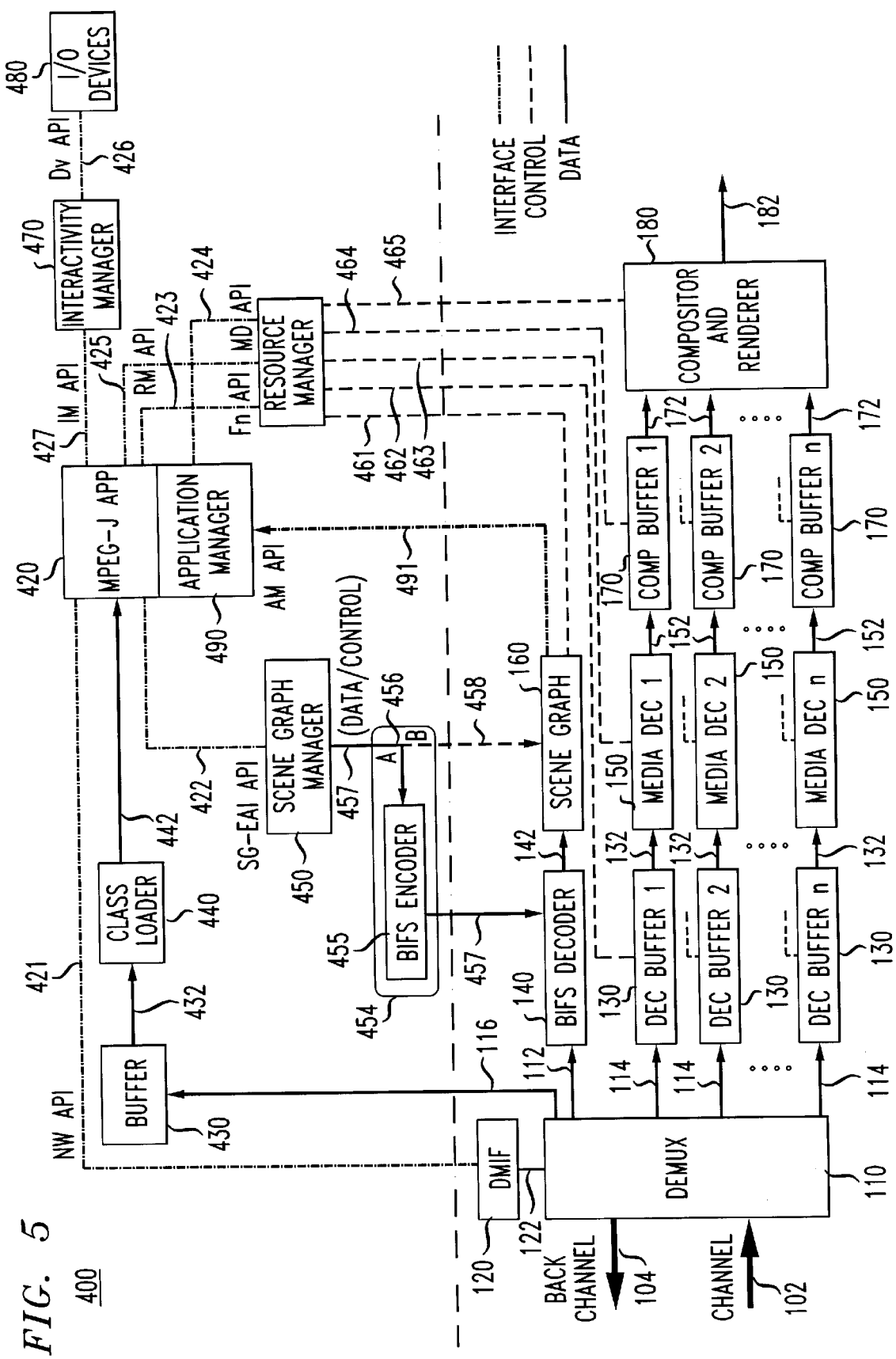
FIG. 5 is a functional block diagram showing in greater detail a third exemplary embodiment of the MPEG-J application engine of FIG. 2 according to this invention.

FIG. 5 shows a functional block diagram illustrating in greater detail a third exemplary embodiment of the MPEG-J application engine 400 of FIG. 2 according to this invention. The third exemplary embodiment of the MPEG-J application engine 400 is generally identical to the second exemplary embodiment of the MPEG-J application engine 300 shown in FIG. 4, except that an interactivity manager 470 is positioned between the MPEG-J application controller 420 and the I/O devices 480, and the scene graph manager 450 is not directly connected to the scene graph controller 160. As shown in FIG. 5, the MPEG-J application controller 420 is connected to the interactivity manager 470 over an interface channel 427 of an interactivity manager application programming interface IM API, while the interactivity manager 470 is connected to the I/O devices 480 over the device interface channel 426 of the device application programming interface Dv API.

Likewise, the scene graph manager 450 is no longer connected to the scene graph controller 160 over the interface channel 452 of the scene graph-external application interface application programming interface SG-EAI API. As in the second exemplary embodiment of the MPEG-J application engine 300 shown in FIG. 4, the scene graph controller 160 is connected to the application manager 490 over the interface channel 491 of the application manager application programming interface AM API. However, the scene graph manager 450 is now connected to a switch 456 over a data/control channel 452 of the scene graph-external application interface application programming interface SG-EAI API.

The A channel out of the switch 456 directs the control and/or data signals from the scene graph manager 450 to a binary format for scene encoder 454. The binary format for scene encoder 454 inputs the data and control signals from the scene graph manager 450 and converts them into new scene content. The binary format for scene encoder 454 outputs the new scene content over a data channel 457 to the binary format for scene decoder 140, where the new scene content is decoded indistinguishably from original scene content and output over the data channel 142 to the scene graph controller 160.

The B channel out of the switch 456 directs the control and/or data signals from the scene graph manager 450 to the scene graph controller 160 over a data channel 458. Thus, while the scene graph manager 450 continues to control the scene graph controller 160, the scene graph manager 450 does not directly interface with the scene graph controller 160.

However, it should be understood that the binary format for scene encoder 454 does not have to be implemented in the third exemplary embodiment of the MPEG-J application engine 400. Rather, as in the first and second exemplary embodiments of the MPEG-J application engine 200 and 300, the scene graph manager 450 can be directly connected to the scene graph controller 160 over the interface channel 452 of the scene graph application programming interface SG-EAI API.

The interactivity manager application programming interface IM API and the interactivity manager 470 permit a greater degree of user input and interactivity with the multimedia scene generated by the MPEG-4 browser or presentation engine 100. Thus, the user input, through the MPEG-J application controller 220, can be used to control and interact with the various elements of the MPEG-4 browser or presentation engine 100 to a greater extent.

The MPEG-J application engines 200–400 outlined above are specific exemplary embodiments of a multimedia browsing control subsystem of a multimedia browsing system according to this invention. The MPEG-4 browser or presentation engine 100 outlined above is a specific exemplary embodiment of a multimedia browsing subsystem of a multimedia browsing system according to this invention. The multimedia browsing subsystem generates a multimedia scene based on a plurality of data streams. The data streams include data defining a number of multimedia objects and data defining control programs or mechanisms that are associated with the multimedia objects.

The multimedia browsing control subsystem (e.g., the MPEG-J application engines 200–400) according to this invention controllably degrades (i.e., graceful degradation of) the multimedia scene generated by the multimedia browsing subsystem (e.g., the MPEG-4 browser or presentation engine 100) in the face of limited system resources available to the multimedia browsing subsystem, and/or in view of complex control mechanisms, or behavior control commands, embedded within the data defining the multimedia scene for intelligently managing the generation of the multimedia scene. The multimedia browsing control subsystem according to this invention separately enables a number of enhanced real-time and other functions for controllably degrading and interacting with the multimedia browsing subsystem in response to user inputs.

It should be understood that each of the buffers, managers, controllers, decoders, application programming interfaces and other elements of the multimedia browsing systems shown in each of FIGS. 1–5 can be implemented as portions of a suitably programmed general purpose computer used to implement the multimedia data processing system 10. Alternatively, each of the elements shown in each of FIGS. 1–5 can be implemented as physically distinct hardware circuits within an ASIC, or using a FPGA, a PDL, a PLA or a PAL, or using discrete logic elements or discrete circuit elements, depending on the particular hardware used to implement the multimedia data processing system 10. The particular form each of the circuits shown in each of FIGS. 1–5 will take is a design choice and will be obvious and predicable to those skilled in the art. For example, the MPEG-J application engine and the MPEG-4 presentation engine can each be implemented as software executing on a programmed general purpose computer, a special purpose computer, a microprocessor or the like that is used to implement the multimedia data processing system 10. In this case, the MPEG-J application engine and the MPEG-4 browser can each be implemented as an embedded routine, as a resource residing on a server, or the like.

The channel 102 and the back channel 104 can be implemented using any known structure or apparatus for transmitting the MPEG-encoded data to the MPEG-4 browser. Thus, the channel 102 and the back channel 104 can be implemented using a public switched telephone network, a local or wide area network, an intranet, the Internet, a wireless transmission channel, any other distributed network, or the like.

There are two scenarios in which MPEG-J may be used. In one possible scenario, the content provider designs all MPEG-J content, and all of the necessary or desirable add-ons for local use and interactivity, such as including commercials, local programming information, scene interactivity, and other subsequent modifications. This is desirable for content providers, at it allows incremental updates. That is, change of state can be done via binary format for scene updates. In a second possible scenario, the client dynamically controls the scene. This is desirable for set-top manufacturers. It should also be appreciated that local programming and interactivity can also be provided by an intermediary between the original content provider and the client.

However, it should be appreciated that changes in non updatable nodes may not be possible. The MPEG-J systems and methods of this invention may eventually need to serve both of these scenarios. Since the first scenario is more deterministic than the second scenario, the exemplary embodiments of the MPEG-J systems and methods of this invention that are described herein mainly support the first scenario while including the hooks to partially support the second scenario.

Application programs based on the MPEG-J API's are made available to the MPEG-4 browser or presentation engine 100 in the form of an MPEG-4 elementary stream. This implies that the "MPEG-J elementary stream" has an associated Elementary Stream Descriptor. Further, a stream type "MPEG-J Stream" is defined in the StreamType table (Table 9) in ISO/IEC 14496-1. The MPEG-J data could be classes or serialized objects transmitted as byte code from servers to clients. Serialized objects are expected to accompany classes that have knowledge about handling those objects.

An MPEG-J session is initiated when the MPEG-4 browser or presentation engine 100 receives an MPEG-J object descriptor. In response to receiving the MPEG-J object descriptor, the MPEG-4 browser or presentation engine 100 opens an MPEG-J elementary stream via a DMIF channel in the demultiplexer layer 110. The MPEG-J elementary stream is an SL packetized stream, similar to all other MPEG-4 streams. The MPEG-4 browser or presentation engine 100 then delivers the& access units of the MPEG-J elementary stream to the buffer 230 of the class loader 240 over the data channel 116. The class loader 240 loads the classes.

An MPEG-J application that uses the MPEG-J application programming interfaces of this invention to control the MPEG-4 browser or presentation engine 100 can either be local or remote relative to the underlying multimedia data processing system 10. In the case of a remote application that is received in the MPEG-J elementary stream, the remote application must implement a remote application interface. The header to the remote application and the remote application interface can be implemented using any appropriate and/or relevant techniques and programming structures known to those skilled in the art.

MPEG-J scene graph capabilities are always based on the tightly integrated or content provider oriented model. In general, the first stream received is the "master" scene graph. Subsequent streams are added as "subtrees" at designated nodes in the master scene graph. The "master" scene graph must acquire its subtrees. However, any tree can be the master scene graph. Nonetheless, subtrees inherit acquisition limits.

The MPEG-J application programming interface is not a single application programming interface but a collection of application programming interfaces that address various interfaces for a flexible MPEG-4 system. Java language is used for application programming interface specification. The MPEG-J application engine includes a number of categories of application programming interfaces, as outlined above. These categories of application programming interfaces include the application manager application programming interface; the scene graph manager application programming interface; the resource manager application programming interface; the interactivity manager application programming interface; the media decoder application programming interface; the functionality application programming interface; the networking application programming interface; and the device application programming interface. Table 1 outlines these application programming interfaces and their main classes or interfaces:

TABLE 1

List of MPEG-J Application Programming Interfaces

| API Category | Main Classes Or Interfaces | Explanation |
| --- | --- | --- |
| Application Manager | Application Manager | Direct interface to scene graph to deal with properties |
| Scene Graph Manager | SBrowser | Means by which MPEG-J apps access and manipulate the BIFS player |
| Resource Manager | Resource Manager | Centralized facility for managing system resources |
| Interactivity Manager | InteractivityManager | Centralized facility for managing user interactivity with scene |
| Media Decoder | MPDecoder | Access and control to the decoders used to decode the audio-visual objects. |
| | Video Decoder | Decoding of video objects |
| | TextureDecoder | Decoding of image texture objects |
| | MeshDecoder | Decoding of wireframe mesh objects |
| | FaceDecoder | Decoding of Face objects |
| | AudioDecoder | Decoding of speech and Audio objects |
| | TTSDecoder | Decoding of TTS objects |
| | StructAudioDecoder | Decoding of structured audio objects |
| Functionality | ProgressiveImage | Progressive decoding of image texture object under user control |
| | HotObject | Selective decoding of active objects for enhancement under user control |
| | DirecDecoding | Selective decoding of object based on viewpoint under user control |
| | Transparency | Selective decoding of full or partial objects based on transparency and user control |
| | TrickMode | Selective decoding of object for playback in trick mode (FF,FR) under user control |
| | Adjust Audio | Selective decoding and enhancement of audio object under user control |
| Network | NetworkManager | Access and control of the network components of the MPEG-4 browser. |
| | BackChannel | Access and control of back channel |
| Device | Input Device | An interface for input device drivers |
| | UserInputDevice | An interface for user input device drivers |
| | AudioDevice | An interface for audio devices |
| | SmartCard | An interface for smart card devices |

Packages are a means to organize the implementations of application programming interfaces. For the list of MPEG-J application programming interfaces outlined above for the systems and methods of this invention, one exemplary set of packages includes an "mpgj.sys" package, an "mpgj.dec" package, an "mpgj.func" package, and an "mpgj.dev" package. The "mpgj.sys" package contains classes for application, scene graph, resource and interactivity manager. The "mpgj.dec" package contains classes for Media decoding. The "mpgj.func" package contains classes for functionalities including interaction. The "mpgj.dev" package contains classes that provide interfaces to various input, output, sound and video devices.

A local or remote MPEG application will use well-defined sets of MPEG-J application programming interfaces to interact with the underlying MPEG-4 browser or presentation engine 100. These Java™ application programming interfaces are implemented on all compliant MPEG-4 browsers or presentation engines. The details of the required implementation of these application programming interfaces can be found in the MPEG-4 systems Version 1 Standard (ISO/IEC 14496-1). It is expected that the local or remote MPEG-J application engine can call methods defined in the MPEG-J application programming interfaces and those from a minimal set of Java™ packages. The MPEG-J application programming interfaces are functionally divided into a network (Nw) application programming interface category; a resource manager (RM) application programming interface category; a media decoder (MD) application programming interface category; a scene graph (SG) application programming interface category; and a functionality (Fn) application programming interface category.

The resource manager (RM) application programming interfaces help to manage resources on the underlying multimedia data processing system 10 during an MPEG-J session. These resource manager (RM) application programming interfaces can be used to adapt an MPEG session to a given data processing system. The main components of the resource manager (RM) application programming interfaces are the resource manager interface and the event model defined by the resource manager.

The resource manager interface supports a number of different functionalities, including access to the media decoder associated with a particular node, providing a list of available media decoders of a specific type, access to the priority associated with a media decoder, event models with downloadable event handlers, events mechanisms for stream and decoder problems, and events mechanisms for renderer problems. That is, the resource manager interface provides access to the renderer, the media decoders and their priorities. The resource manager interface also defines methods to gain access to a media decoder given a node in the scene graph and change it to another available media decoder. The media decoders and the decoder functionality application programming interfaces rely on the resource manager to obtain the instance of a media decoder.

The resource manager interface provides a centralized facility for managing resources. The resource manager interface is a collection of a number of classes and interfaces, including MPDecoderEventGenerator, MPRendererEventGenerator, MPDecoderMediaListener, and MPRendererMediaListener interfaces, and "MPDecoderMediaEvents", "ResourceManager", "Renderer", and "MPRendererMediaEvents" classes.

For each media decoder, the resource manager (RM) application programming interface has an installation of a class that implements MPDecoder or a sub-interface. These media decoder installations generate the events for different situations. The resource manager (RM) application programming interface can handle events if necessary in addition to the event handlers in the application. The MPEG-J application engine can receive the Event handlers as bytecode in the bit stream.

Apart from implicitly specifying this event model, the resource manager (RM) application programming interface also provides access to the media decoders and their priorities. Given a node in the scene graph, resource manager (RM) application programming interface provides access to the media decoder associated with that node. The resource manager (RM) application programming interface also facilitates setting and getting the media decoder priorities. The resource manager (RM) application programming interface also enables changing which media decoder is associated with a particular node.

The resource manager (RM) application programming interfaces also define decoder and renderer events. The corresponding interfaces for event generators and listeners, such as event handlers, are also defined. The resource manager (RM) application programming interfaces implicitly define an event model for graceful degradation. For each media decoder, the resource manager (RM) application programming interfaces would have an instantiation of a class that implements an MPDecoder interface or a sub-interface. These decoder instances generate the events corresponding to different situations. These events can handle events if necessary in addition to the default event handlers in the application. The MPEG-J application engine can receive the event handlers as bytecode in the bitstream.

Program execution may be contingent upon the configuration of the particular data processing system and its capabilities. An MPEG-J session may need to be aware of its environment, so that it is able to adapt its own execution, and the execution of the various components as they may be configured and running in the MPEG-4 browser 100.

The network (Nw) application programming interfaces allow control of the network component of the MPEG-4 browser or presentation engine 100. Through the network (Nw) application programming interfaces, the MPEG-J application engine can interact with the distributed network to which the MPEG-4 browser or presentation engine 100 is connected. The network (Nw) application programming interfaces allow the MPEG-J application engine to monitor the network resources and controllably degrade the multimedia scene in view of the network resources. It should be appreciated that those skilled in the art would be able to provide network (Nw) application programming interfaces for the MPEG-4 browser or presentation engine 100 and the MPEG-J application engine described herein using known techniques and programming structures.

The media decoder (MD) application programming interfaces facilitate basic control, such as start, stop, pause, resume and the like, of all the installed decoders in an MPEG session. A list of decoders that are currently installed and those available can be obtained through the resource manager. The resource manager also provides the instance of the decoder associated with a node in the scene graph.

The media decoder (MD) application programming interfaces support a number of different functionalities, including starting, stopping, pausing, and resuming a decoder, attaching and detaching a decoder to elementary streams, and getting the type and other attributes of a decoder.

The MPDecoder is an interface that abstracts the most generic decoder. The MPDecoder interface facilitates attaching and detaching decoders to elementary streams. It also provides for access to the type, vendor, and an instance number of the decoder. A number of interfaces that abstract decoders, like a scalable video decoder, i.e., the SclVideoDecoder interface, a structured audio decoder, i.e., the SclAudioDecoder interface, that are sub-interfaces of MPDecoder interface are also defined. These subinterfaces provide access and control to specialized features of that particular decoder.

The scene graph (SG) application programming interfaces provide mechanisms for controlling the scene graph and/or the scene graph controller. The scene graph (SG) application programming interface allows the behavior of a node of the scene graph to be changed and allows the scene graph to be edited. The scene graph (SG) application programming interface supports a Browser Object. The scene graph (SG) application programming interface also supports updatable nodes and/or MPEG-J accessible nodes of the scene graph.

For the content provider scenario described above, the scene graph (SG) application programming interface supports user priority only on those objects that the content provider has indicated as allowable, and scene graph manipulation only corresponding to those objects that the content provider has indicated as allowable. For the user scenario described above, the scene graph (SG) application programming interface supports user priority and scene graph manipulation on all objects. One exemplary embodiment of the scene graph (SG) application programming interface allows for tagging multiple streams as sources and selecting one stream as the master.

In the scene graph (SG) application programming interface according to this invention, there is a browser for each subtree, and is the interface between MPEG-J and that subtree. There are two modes for updating a node, a binary format of scene stream mode and a direct node access mode. The scene graph (SG) application programming interface according to this invention supports binary format for scene updates, turning off the rendering of certain objects, attaching objects to nodes, and the like.

The functionality (Fn) application programming interfaces provide mechanisms for controlling the media decoding process. In particular, a number of useful predefined functionalities become possible under user control. The functionality (Fn) application programming interfaces are dependent on other parts of the other parts of the MPEG-J application engine 200, such as the media decoder (MD) application programming interfaces, the resource manager (RM) application programming interfaces, and the scene graph (SG or SG-EAI) application programming interfaces. Accordingly, the functionality (Fn) application programming interfaces will most likely change as these other application programming interfaces mature.

The current implementation of the functionality (Fn) application programming interfaces support a number of different functionalities, including a ProgressiveImage function; a HotObject function; a DirecDecoding function; a Transparency function; and a TrickDecoding function.

The functionality (Fn) application programming interfaces include interfaces for each of these functionalities. The ProgressiveImage interface triggers the action of progressive refinement of quality of the image being decoded under user control. The ProgressiveImage interface extends the "SclTextureDecoder", which is used to decode image texture streams. The HotObject interface triggers the action of enhancement of a visual object provided that the object is a hot object. Thus hot objects have some enhancement streams associated with them that are triggered when needed. The HotObject interface extends the "SclVideoDecoder", which is used to decode base and enhancement streams.

The DirecDecoding interface allows creation of visual objects that are directionally sensitive. The DirecDecoding interface is most easily explained by assuming a bitstream composed of a number of static video object planes (visual Ops) coded as an audio-video object such that depending on the user interaction, video object planes corresponding to one or more viewpoint are decoded as needed. The Transparency interface allows formation of visual objects with transparency information. The Transparency interface also supports selective decoding of objects under user control. The user may not need to decode all objects or portions of object due to bandwidth/computing resources. If certain objects or portions of object are hidden they may not need to be decoded. The portions of objects not to be shown can be marked with the transparency color, which can be extracted to form transparency information. This process can also be used to highlight or mark objects. The Trick-Decoding interface allows selective decoding of audiovisual objects for playback in trick mode (i.e., fast forward (FF) or rewind (FR)) under user control.

Although the MPEG-J systems, methods and application programming interfaces of this invention do not cover a capability manager application programming interface, a profile application programming interface, a terminal capabilities application programming interface, a section filter application programming interface, a service information/object content information application programming interface, or a timing application programming interface, these application programming interfaces are fully described in the MPEG-J standard, and are specifically described in "Text for VM 6.0 Systems Version 2 (MPEG-J)", ISO/IEC JTCI/SC29/WG11/W2741p3, Seoul, Korea, Mar. 1999. The network application programming interface is described in greater detail in "Text for ISO/IEC 14496-1/PDAMI (MPEG-4 version 2 MPEG-J)", ISO/IEC JTCI/SC29/WG11/N2739p3, Seoul, Korea, Mar. 1999.

The MPEG-J application programming interface specifications for the various MPEG-J application programming interface described above are set forth below.

The MPEG-J Application Manager application programming interface specification is set forth below:
Interface mpgj.sys.ApplicationManager public interface ApplicationManager This interface allows the scene graph to access information from application. This interface is implemented by the application, the application manager is registered with a node that can call the application.
Constructors
  public ApplicationManager ( )
Methods
  Public java.lang.String getproperty(int nodeId, java.lang.String property)
  This method will be called by node object to get property information from the application or applet. The node identifies itself with nodeId, while the string specifies the property that it is interested in.
Class mpgj.sys.NodeCanCallAM

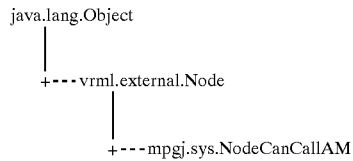

public abstract class NodeCanCallAM
    extends vrml.external.Node
  This is a special node object that is capable of calling Application Manager.
Constructors
  public NodeCanCallAM ( )
Methods
  public void registerAM(ApplicationManager am)
  This is to be called by MPEG-J application.

The MPEG-J Scene Graph application programming interface specification is set forth below:
Interface mpgj.sys.ScenegraphManager
  public interface ScenegraphManager
  Interface that MPEG-J applications access and manipulate the BIFS player.
Methods
  public void createNode(java.lang.String nodeName,
      java.lang.String[ ] fields,
      java.lang.String[ ] values)
  Creates a node with nodeName, fields, and field values. There is a one to one correspondence between the field names and the values and the field names and the values are given in the same order. If a field is missing, the default value is used as specified in the systems document. The underlying implementation is expected the create a node exactly the same way in which it is done in the case of creating a node in the BIFS stream.
  Parameters:
      nodeName—The name of the node
      fields—field names
      values—values of fields
  public void addRoute(vrml.external.Node fromNode,
      java.lang.String eventOut,
      vrml.external.Node toNode,
      java.lang.String eventin).
  Adds a route between two nodes, from an eventOut to an eventln. If the ROUTE already exists, this method silently exits. It does not attempt to add a second parallel ROUTE.
  public void deleteRoute(vrml.external.Node fromNode,
      java.lang.String eventOut,
      vrml.external.Node toNode,
      java.lang.String eventin)
  Deletes a route between two nodes. If the route does not exist, the method silently exits.
  public void beginupdate ( )
  Locks the output from the external interface to the scene graph as the code is about to begin a series of updates. No events will be passed to the scene graph. They will be buffered pending release due to a subsequent call to endUpdate. This call is a nesting call which means subsequent calls to beginupdate are kept on a stack. No events will be released to the scene graph until as many endUpdates have been called as beginUpdate.

public void endupdate ( )

Releases the output of events from the external interface into the scene graph. All events posted to this point from the last time that beginupdate was called are released into the scene graph for processing at the next available opportunity. This call is a nesting call which means subsequent calls to beginupdate are kept on a stack. No events will be released to the scene graph until as many endUpdates have been called as beginupdate. If no beginUpdate has been called before calling this method, it has no effect.

public vrml.external.Node getNode(java.lang.String name)

Gets a DEF node by name. Nodes given DEF names in the root scene graph are available to be retrieved by this method. DEFed nodes in Inlines are not available.

Although they have not been explicitly included here, all the EAI API's except the Browser interfaces and classes of the Virtual Reality Markup Language can be used for scene graph control.

The MPEG-J Resource Manager application programming interface specification is set forth below:

Interface mpgj.sys.MPDecoderEventGenerator

Subinterfaces: MPDecoder, ScdDecoder public interface MPDecoderEventGenerator

Methods public void addMPDecoderMediaListener (MPDecoderMediaListener 1)

public void removeMPDecoderMediaListener (MPDecoderMediaListener 1)

Interface mpgj.sys.MPRendererEventGenerator

Subinterfaces: Renderer public interface MPRendererEventGenerator

Methods public void addMPRendererMediaListener (MPRenderMediaListener 1)

public void removeMPRendererMediaListener (MPRenderMediaListener 1)

Interface mpgj.sys.Renderer public interface Renderer
implements MPRendererEventGenerator For each decoder, the Resource Manager would have an installation of a class that implements the MPDecoder interface, described below, or a sub-interface. These decoder installations generate the events for different situations. The resource manager implementation can handle events, if necessary, in addition to the event handlers in the application (the order of which is left to the implementation). The MPEG-J application can receive the Event handlers as bytecode in the bitstream.

Interface mpgj.sys.ResourceManager public interface ResourceManager

Methods public void setDecPriority(MPDecoder dec, int priority)

Overrides or changes the priority of a media elementary stream.

public int getDecPriority(MPDecoder dec)

Gets the priority of a media elementary stream.

public void checkDynResources(int memory,int scratch, int processLoad)

Gets dynamic system resource information, such as, for example, information about memory, scratch space and processor loads.

public void checkStatResources(int grpcards,int devices, int plugins)

Gets static system resource information, such as, for example, information about graphics cards, hardware devices and software plugins.

public MPDecoder getDecoder(int nodeid)

Gets the media decoder for the identified node.

public Renderer getRenderer ( )

Gets the renderer and readies the presentation engine to add events to renderer.

Interface mpgj.sys.MPDecoderMediaListener public interface MPDecoderMediaListener
extends java.util.EventListener Methods public abstract void mPDecoderMediaHandler (MPDecoderMediaEvents event)

Interface mpgj.sys.MPRendererMediaListener public interface MPRendererMediaListener
extends java.util.EventListener Methods public abstract void mPRendererMediaHandler (MPRendererMediaEvents event)

Class mpgj.sys.MPDecoderMediaEvents

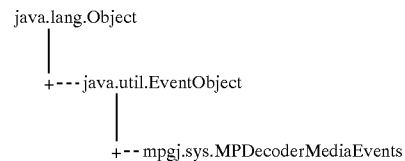

public class MPDecoderMediaEvents
extends java.util.EventObject

Constants and Variables public static final int DECODER_OVERFLOW public static final int DECODER_SYNC_ERROR public static final int STREAM_UNDERFLOW public static final int STREAM_OVERFLOW public static final int STREAM_START public static final int STREAM_END Constructors public MPDecoderMediaEvents(int condition)

Methods public int getcondition ( )

The obtained condition can correspond to decoder overflow, sync error or end of decode.

Class mpgj.sys.MPRendererMediaEvents

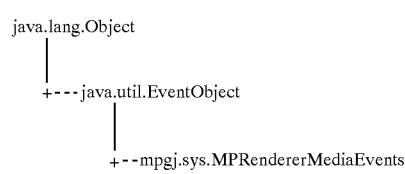

public class MPRendererMediaEvents
extends java.util.EventObject

Constants and Variables public static final int DECODER_UNDERFLOW public static final int MISSED_FRAMES Constructors public MPRendererMediaEvents(int condition)

Methods public int getCondition ( )

The MPEG-J Media Decoders application programming interface specification is set forth below:
Class mpgj.dec.MPDecoder
  public abstract class MPDecoder
    Implements MPDecoderEventGenerator and MPStreamEventGenerator.
    This is the base class for media decoders.
Constructors
  public MPDecoder
Methods
  public void start
    Starts decoding of data.
  public void stop ( )
    Stops decoding of data.
  public void pause ( )
    Pauses decoding of data.
  public void resume ( )
    Resumes decoding of data.
  public void attach (int esid)
    Attaches a decoder for decoding of data.
  public void detach ( )
  Detaches a decoder already decoding data.
Interface mpgj.dec.SclDecoder
  Subinterfaces: SclTextureDecoder, SclVideoDecoder
  public interface ScdDecoder
    extends MPDecoderEventGenerator, MPStreamEventGenerator
  This is the base interface for scalable enhancement.
Methods
  public int getLevel ( )
  Gets the spatial enhancement layer number.
  public int getMode ( )
  Gets the spatial enhancement mode number.
  public boolean sptEnh(int e_level,$e_{13}$ mode)
    throws InvalidDecoderLevelException, InvalidDecoderModeException
  Sets the decoding mode to spatial enhancement layer and returns a boolean to indicate if it succeeded or not, $e_{13}$ level is the enhancement layer number, while $e_{13}$ mode is the subtype in that layer.
  public boolean tmpEnh(int $e_{13}$ level,int e_mode)
    throws InvalidDecoderLevelException, InvalidDecoderModeException
  Sets the decoding mode to temporal enhancement layer and returns a boolean to indicate if it succeeded or not.
  public boolean snrEnh(int e_level,int e_mode)
    throws InvalidDecoderLevelException, InvalidDecoderModeException
  Sets the decoding mode to snr enhancement layer and returns a boolean to indicate if it succeeded or not.
Interface mpgj.dec.VideoDecoder
  Subinterfaces: SclVideoDecoder, Transparency
  public interface VideoDecoder
    extends MPDecoder
  Decoding of video objects.
Interface mpgj.dec.SclVideoDecoder
  Subinterfaces: DirecDecoding, HotObject
  public interface SclVideoDecoder
    extendsVideoDecoder, SclDecoder
  Decoding of scalable video objects.
Methods
  public boolean datapart(int e_level,int e_mode)
  Sets the decoding mode to data partitioning enhancement layer and returns a boolean to indicate if it succeeded or not.

Interface mpgj.dec.TextureDecoder
  Subinterfaces: SclTextureDecoder
  public interface TextureDecoder
    extends MPDecoder
  Decoding of image texture objects
Interface mpgj.dec.SclTextureDecoder
  Subinterfaces: ProgressiveImage
  public interface SclTextureDecoder
    extends TextureDecoder, SclDecoder
Interface mpgji.dec.MeshDecoder
  public interface MeshDecoder
    extends MPDecoder
  Decoding of wireframe mesh objects
Interface mpgj.dec.FaceDecoder
  Subinterfaces: SclFaceDecoder
  public interface FaceDecoder
    extends MPDecoder
  Decoding of Face objects
Interface mpgj.dec.SclFaceDecoder
  public interface SclFaceDecoder
    extends FaceDecoder
  This interface extends FaceDecoder. It contains methods to scale decoder performance.
Methods
  public boolean pickModel(int mode)
    Sets the decoding mode and returns a boolean to indicate if it succeeded or not.
    The 'mode' variable indicates one of the three choices—default model without calibration, default model with calibration, and, the downloaded model.
  public boolean pickFAP(int mode)
    Sets the decoding mode and returns a boolean to indicate if it succeeded or not. The 'mode' variable indicates one of the two choices—all FAP groups, and, viseme and expression group of FAP only.
  public boolean pickFIT(int mode)
    Sets the decoding mode and returns a boolean to indicate if it succeeded or not. The 'mode' variable indicates one of the two choices—use FIT, and, ignore FIT.
  public boolean sclBitrateDown ( )
    Decrease decoder bitrate.
  public boolean sclcomplexity ( )
    Decrease decoder complexity.
Interface mpgj.dec.AudioDecoder
  public interface AudioDecoder
    extends MPDecoder
Interface mpgj.dec.SclAudioDecoder
  public interface SclAudioDecoder
    extends AudioDecoder
  This interface extends AudioDecoder. It contains methods to scale decoder perforrnance.
Constants
  public static final int PARAMETRIC
  public static final int CELP
  public static final int AAC
Methods
  public boolean sclBitrateUp ( )
  Increase decoder bitrate for scalable stream.
  public boolean sclBitrateDown ( )
  Decrease decoder bitrate for scalable stream.
  public boolean sclBandwidth (int region)
  public boolean sclComplexity ( )

public boolean sclType (int type)
Interface mpgj.dec.TTSDecoder
    public interface TTSDecoder
        extends MPDecoder
    Decoding of TTS objects.
Interface mpgj.dec.StructAudioDecoder
    public interface StructAudioDecoder
        extends MPDecoder
    Decoding of structured audio objects.

The MPEG-J Functionality application programming interface specification is set forth below:

Interface mpgj.func.ProaressiveImage
    public interface ProgressiveImage
        extends SclTextureDecoder
    ProgressiveImage allows progressive refinement of quality of an image under user control. The images are assumed to be static (still image vops).
    Methods
        public int selectProgLevel ( )
        Select level up to which decoding of transform (DCT or wavelet) coefficients will take place. A level constitutes coefficients up to a certain position in scan order.
Interface mpgj.func.HotObject
    public interface HotObject
        extends SclVideoDecoder
    HotObject is a interface that triggers the action of enhancement of a visual object provided that the object is a hot object.
    Methods
        public int selectHotType ( )
        Selects type of enhancement (spatial, quality, temporal etc.).
Interface mpgj.func.DirecDecoding
    public interface DirecDecoding
        extends SclVideoDecoder
    DirecDecoding is an interface that allows creation of visual objects that are directionally sensitive.
    Methods
        public int selectDirec ( )
        Selects the direction (scene orientation). A number of prespecified directions are allowed and selection takes place by clicking a mouse on hot points on the object or via a menu.
Interface mpgj.func.Transparency
    public interface Transparency
        extends VideoDecoder
    The Transparency interface allows formation of visual objects with transparency information.
    Methods
        public int redirect ( )
Interface mpgj.func.TrickDecoding
    public interface TrickDecoding
        extends MPDecoder
    Selective decoding of objects for playback intrickmode (FF, FR.) under user control. TrickDecoding is an interface that can be used to decode audio visual objects for trick play.
    Methods
        public float fastforw (float speed)
            throws InvalidDecoderSpeedException
    Start decoding of data at the speed specified. The speed must be positive. The speed=1 for normal playing. It returns the effective speed set.
        public float fastrev (float speed)
            throws InvalidDecoderSpeedException
    Stop decoding of data at the speed specified. The speed must be positive. The speed=1 for normal playing.

public void freezeDec ( )
        Temporarily suspend decoding of data.
        public void resumeDec ( )
        Restart decoding of data from current state of pause.
        public void loopDec ( )
        This method allows user interactive decoding of selected portions of the srcstream for forward or reverse playback at a variety of speeds.
        public float getSpeedAndDirec ( )
        Get the direction of decoding and speed.
Interface mpgj.func.AdjustAudio
    public interface AdjustAudio
        extends SclAudioDecoder
    AdjustAudio allows refinement of quality of audio under user control.
    Methods
        public boolean incrSpeed(float percent)
        Increase speed of decoder without changing pitch.
        public boolean decrSpeed(float percent)
        Decrease speed of decoder without changing pitch.
        public boolean incrpitch(float percent)
        Increase pitch of decoder without changing speed.
        public boolean decrpitch(float percent)
        Decrease pitch of decoder without changing speed.

The MPEG-J Device application programming interface specification is set forth below:

Interface mpgj.dev.InputDevice
    public interface InputDevice
    The input device application programming interface is a common interface for input device drivers. The application would expect all of the methods of the application programming interface to be implemented. This API is modeled after the JAVA 3D Input Device application programming interface, and is intended as a starting point for discussion.
    Constants
        public static final int POLLED
        public static final int STREAMING
        These flags specify the mode in which the associated device works.
    Methods
        public abstract boolean initialize ( )
        Returns true if initialization succeeds, false otherwise.
        public abstract void setProcessingMode(int mode)
        public abstract int getProcessingMode ( )
        public abstract int getSensorCount ( )
        Returns the number of sensor objects associated with the device.
        public abstract Sensor getSensor(int sensorindex)
        Returns the specified sensor
        public abstract void setNominalPositionAndOrientation ( )
        Sets the devices current position and orientation as nominal.
        public abstract void pollAndProcessInput ( )
        Polls the device for data and processes the received values.
        public abstract void processStreamInput ( )
        public abstract void close ( )
Interface mpgj.dev.AudioDevice
    public class AudioDevice
    The audio device interface is a preliminary specification of what would be required to incorporate a device driver for an audio device into an MPEG-J implementation. This API is modeled after the JAVA 3D AudioDevice API.

Constants
  public final static int HEADPHONES
  public final static int MONO_SPEAKER
  public final static int STEREO_SPEAKERS
  public final static int SURROUND_5_1
  public final static int SURROUND_7_1
Methods
  public abstract boolean initialize ( )
  public abstract boolean close ( )
  public abstract void setAudioPlaybackType (int type)
  public abstract int getAudioPlaybackType ( )
  Set or retrieve the device type (Mono Stereo or Headphones)
    public abstract void setCenterEarToSpeaker (float distance)
    public abstract float getCenterEarToSpeaker ( )
  Sets or retrieves the distance from the center ear and one of the speakers in the listeners environment.
    public abstract void setAngleOffsetToSpeaker (float angle)
    public abstract float getAngleOffsetToSpeaker ( )
  Sets or retrieves the angle between the vectors from the center ear to each of the speaker transducers.
    public abstract int getTotalChannels ( )
    public abstract int getChannelsAvailable ( )
    public abstract int getChannelsUsedForSound ( )
    Returns the number of channels needed to render a particular sound node.

The MPEG-J Interactivity Manager application programming interface specification is set forth below:
Interface mpgj.sys.InteractivityManager
  public interface InteractivityManager
  This interface provides a centralized facility for managing user interactivity with the scene.
Methods
  public java.lang.String getName ( )
  public void setpickability(int id, int pickability)
  public void clearpickability(int id, int pickability)
  public void getPickability(int id, int pickability)
  public void resetPickability(int id)
  The value "id" specifies the node for every pickable object. There is I bit associated with each capability. Thus, it is possible to set or reset one capability at a time. The Mouse Events include mouse click, mouse drag, mouse entered, mouse exited, mouse first, mouse last, mouse moved, mouse pressed, and mouse released.

As shown in FIGS. 1–5, the MPEG-J application engine and the MPEG-4 browser are preferably implemented on a multimedia data processing system such as a programmed general purpose computer. However, the MPEG-J application engine and the MPEG-4 browser can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the application programming interfaces and the various system elements shown in FIGS. 1–5, can be used to implement the MPEG-J application engine and the MPEG-4 browser.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:
1. A multimedia browsing system, comprising:
a multimedia browsing subsystem that generates a multimedia scene based on a scene description, the multimedia scene comprising at least one multimedia object and the scene description defining spatial and temporal positioning of each object within the scene; and
a multimedia browsing control subsystem that controls the multimedia browsing subsystem based on a control program associated with the at least one multimedia object;
wherein:
the multimedia browsing control subsystem controls a behavior of the multimedia browsing subsystem based on behavior control commands of the control program associated with the at least one multimedia object;
the multimedia browsing system is executing on a data processing apparatus having at least one system resource;
the behavior control commands associated with the at least one multimedia object controllably modifying the multimedia scene based at least on a status of the one system resource;
the multimedia browsing subsystem is controlled by the multimedia browsing control subsystem through at least one application programming interface, which includes at least one each of an application manager application programming interface, a scene graph application programming interface, a resource manager application programming interface, a media decoder application programming interface, a functionality application programming interface, a network application programming interface, a device application programming interface, and an interactivity application programming interface;
wherein:
the multimedia browsing control subsystem comprises:
an application controller; and
a scene graph manager;
the scene graph application programming interface connects the application controller and the scene graph manager;
the scene graph manager is connected to a scene graph controller of the multimedia browsing subsystem;
wherein the multimedia browsing subsystem further comprises a scene graph decoder that decodes encoded scene graph data, and that outputs the decoded scene graph data to the scene graph controller;
the multimedia browsing control subsystem further comprises a scene encoder connected to the scene graph decoder of the multimedia browsing subsystem and controllably connectable to the scene graph manager; and
the scene graph manager controls the scene encoder to create additional encoded scene graph data based at least on the multimedia scene being controllably modified based at least on a status of the one system resource, the scene encoder outputting the additional encoded scene graph data to the scene graph decoder.

2. The multimedia browsing system of claim 1, wherein the multimedia browsing control subsystem further comprises a switch that selectively connects the scene graph manager to one of the scene encoder and the scene graph controller.

3. The multimedia browsing system according to claim 1, wherein the behavior control commands associated with the at least one multimedia object controllably degrade the multimedia scene based at least on a status of the one system resource.

4. A method for browsing an MPEG-4 multimedia scene comprising at least one MPEG-4 multimedia object, comprising:

generating, using a multimedia browsing subsystem, the MPEG-4 multimedia scene based on an MPEG-4 scene description, the MPEG-4 scene description defining spatial and temporal positioning of each MPEG-4 multimedia object within the scene, including executing the MPEG-4 scene description on a data processing apparatus having at least one system resource;

controlling the generation of the MPEG-4 multimedia scene based on an MPEG-J control program associated with the at least one MPEG-4 multimedia object by controlling the multimedia browsing subsystem using a multimedia browsing control subsystem, which includes at least one each of an application manager application programming interface, a scene graph application programming interface, a resource manager application programming interface, a media decoder application programming interface, a functionality application programming interface, a network application programming interface, a device application programming interface, and an interactivity application programming interface, including:

connecting the multimedia browsing subsystem to the multimedia browsing control subsystem through at least one application programming interface;

connecting an application controller and a scene graph manager through the scene graph application programming interface;

connecting the scene graph manager to a scene graph controller of the multimedia browsing subsystem;

controllably modifying the MPEG-4 multimedia scene based at least on a status of the one system resource;

decoding encoded scene graph data using a scene graph decoder of the multimedia browsing subsystem;

outputting decoded scene graph data to the scene graph controller;

connecting a scene graph encoder to the scene graph decoder of the multimedia browsing subsystem;

controllably connecting the scene graph encoder to the scene graph manager;

controlling the scene graph encoder using the scene graph manager to create additional encoded scene graph data based at least on the multimedia scene being controllably modified based at least on a status of the one system resource; and outputting the additional encoded scene graph data from the scene graph encoder to the scene graph decoder.

5. The method of claim 4, further comprising:

selectively connecting the scene graph manager to one of the scene encoder and the scene graph controller using a switch.

6. The method according to claim 4, wherein controllably modifying the MPEG-4 multimedia scene includes controllably degrading the MPEG-4 multimedia scene based at least on a status of the one system resource.

* * * * *